June 24, 1924.

W. F. STIMPSON 1,498,936

SCALE

Original Filed Oct. 31, 1914   4 Sheets-Sheet 1

WITNESSES:

INVENTOR
Walter F. Stimpson

BY

ATTORNEYS

June 24, 1924.

W. F. STIMPSON

SCALE

Original Filed Oct. 31, 1914    4 Sheets-Sheet 2

1,498,936

WITNESSES:

INVENTOR
Walter F. Stimpson

BY

ATTORNEYS

June 24, 1924.
W. F. STIMPSON
SCALE
Original Filed Oct. 31, 1914   4 Sheets-Sheet 3
1,498,936
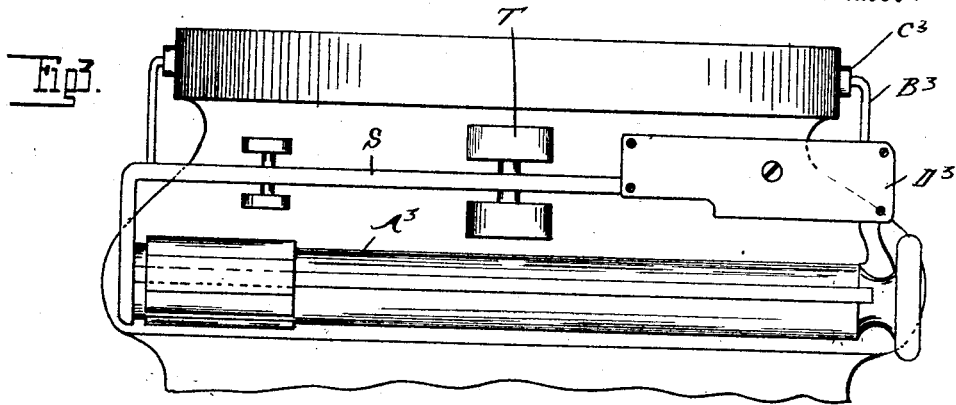
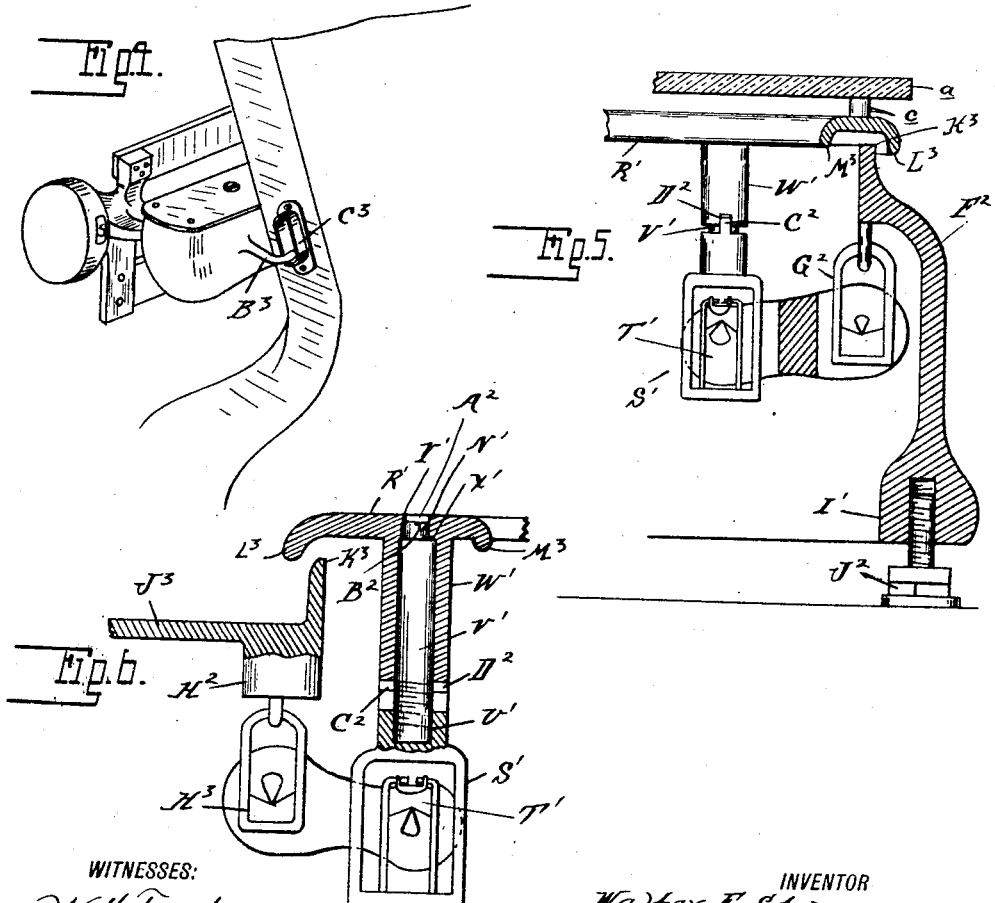
WITNESSES:
INVENTOR
Walter F. Stimpson
BY
ATTORNEYS

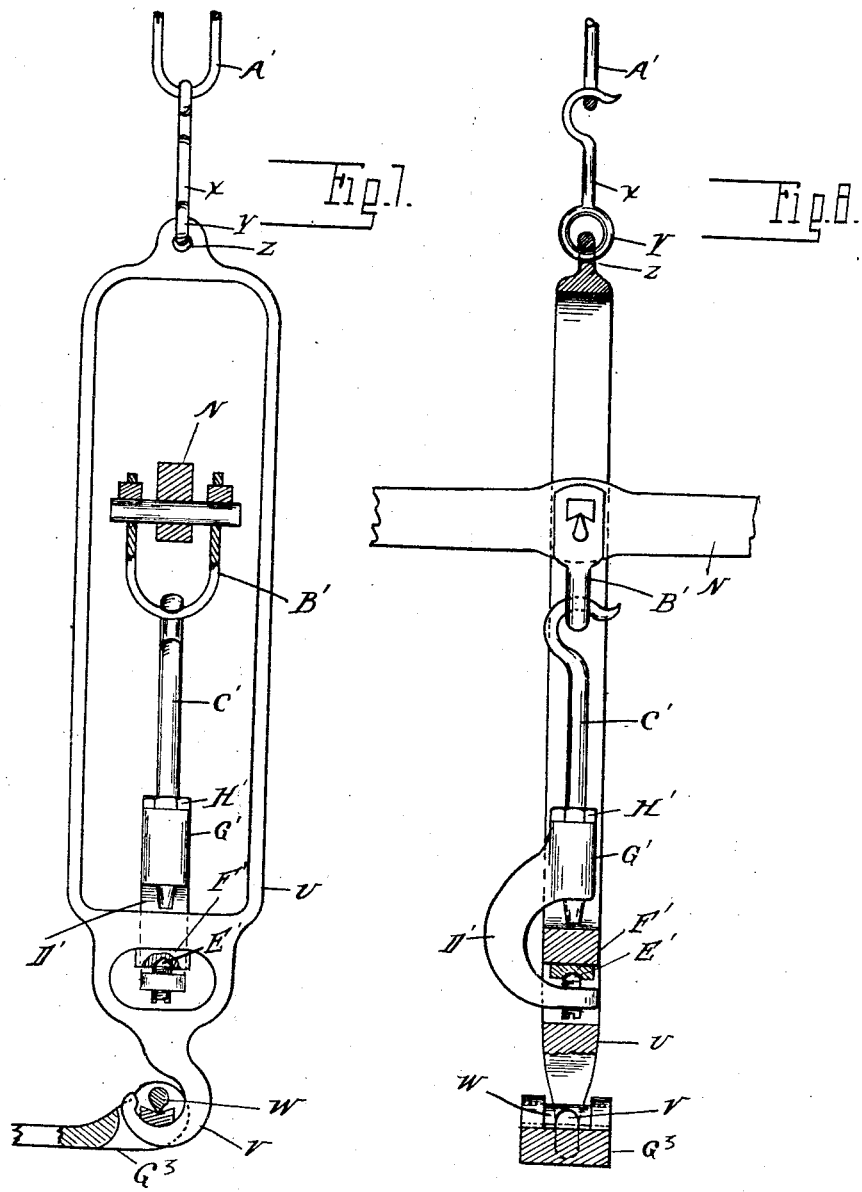

Patented June 24, 1924.

1,498,936

UNITED STATES PATENT OFFICE.

WALTER F. STIMPSON, OF DETROIT, MICHIGAN.

SCALE.

Application filed October 31, 1914, Serial No. 869,556. Renewed December 5, 1923.

*To all whom it may concern:*

Be it known that I, WALTER F. STIMPSON, a citizen of the United States of America, residing at Detroit, in the county of Wayne and State of Michigan, have invented certain new and useful Improvements in Scales, of which the following is a specification, reference being had therein to the accompanying drawings.

The invention relates to scales, and more particularly to scales of the computing type. The invention resides in the novel construction and arrangement of the various lever mechanisms of the scale; in the novel connection between the platform levers, the pendulum and the tare beam; in the peculiar construction and arrangement of the scale base and the bearings for the platform levers; in the novel construction of the platform supports. Further, the invention consists in certain details of construction and arrangements and combinations of parts as will more fully hereinafter appear.

In the drawings,—

Figure 3 is a partial top plan view;

Figure 4 illustrates a detail of construction;

Figures 5 and 6 are views of the platform bearings; and

Figures 7 and 8 are sectional views illustrating the connection between the platform levers, the pendulum and the tare beam.

Figure 1:
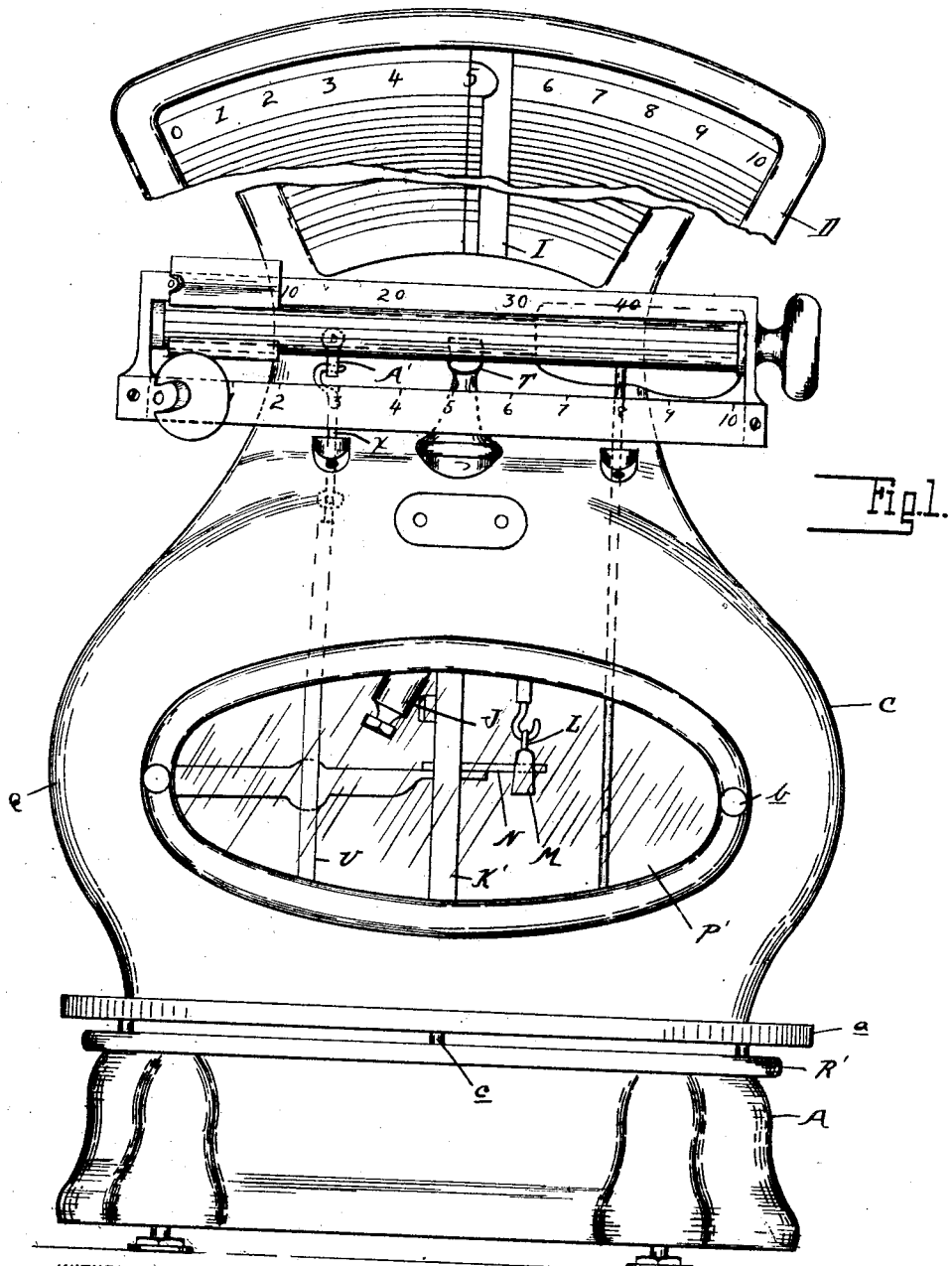
Figure 1 is a front elevation of a scale embodying the invention.

A designates the scale base, herein shown as provided with an extension B upon which is mounted an upwardly-extending frame section C carrying at its upper end the usual computing chart D. Within the base A are arranged the platform levers which are of standard construction. F is the long platform lever having its forward end $G^3$ projecting into the portion B, and I is the index hand for the chart having a suitable pendulum weight J. K is the tape of the pendulum weight and the lower end of this tape is connected at L to a bearing M at the outer end of a lever N. The latter lever is fulcrumed on a standard P supported by and extending upwardly from the extension B and preferably arranged adjacent one side of the frame section C, the latter as shown in Figure 1, being provided with an enlarged portion Q within which the weighted end R of the lever N is arranged. S is the tare beam lever which is fulcrumed at T upon the exterior of the section C.

The connection between the tare beam and the lever F comprises a loop-shaped member U having a hook portion V at its lower end engaging a bearing W on the outer end of the lever F and carrying at its upper end a member X having at its lower end a loop Y pivotally engaging an eye Z in the member U. The upper end of the member X is hook-shaped and engages a bearing A' on the tare beam lever.

The lever N is connected to be operated by the steelyard rod connection U and as shown, extends through the loop-shaped steelyard rod and is provided with a bearing B' on the portion which intersects the steelyard rod. Connected to this latter bearing is a rod C' that carries at its lower end a hook-shaped member D' provided with a needle-point bearing E' that engages a bearing block F' upon the steelyard rod. The member C' has a threaded engagement with a bearing portion G' of the member D' and is secured in its adjusted position by means of a lock-nut H'. By this arrangement the length of the connection between the steelyard rod and the lever N may be varied or regulated without affecting the connection between the platform levers and the tare beam.

The bearing I' of the pendulum engages a bearing block J' at the upper end of a standard K'. Positioned upon the standard is a level O' for assisting in truing the scale frame after it has been arranged upon the counter or other support. In the particular structure shown, the level O' is arranged below a buffer M'. The portion C of the frame is provided upon opposite sides thereof with transparent panels P' which allow the level to be readily read and which exposes a portion of the lever mechanism to view. These panels are detachably connected to the portion C as by means of thumb-screws b, thereby affording ready access to the parts within the frame C.

It is customary to accurately adjust the platform hangers before the scale leaves the factory, but it has been found that errors frequently arise in making the adjustment, and with the types of scales in quite common use, if the platform is not accurately adjusted at the factory, it is necessary to return the parts to the factory in order that they may be properly adjusted. I have therefore, devised a novel form of platform hanger in which the adjustment may be readily made after the scale has been assembled and by which an adjustment of the platform may be accomplished by one not skilled in the art. Referring to the one embodiment of the feature of my invention shown in the drawings, R' is the platform frame and S' the supports therefor, four being shown in the structure illustrated. Each of these supports carries a suitable bearing T' and is provided at the upper end with an internally threaded portion U' for engaging a pin V' that is arranged within a cylindrical, downwardly-extending projection W' on the platform frame. The upper end of the pin V' is provided with a shoulder X' that is engaged by a shoulder Y' at the upper end of the projection W'. Z' is a reduced portion on the pin V' that projects through an opening $A^2$ in alignment with the hollow projection W', and this portion Z' is slotted at $B^2$ to receive a screw-driver or other adjusting tool. Thus by turning the member V' the platform frame may be raised or lowered as desired. In order to prevent rotation of the hanger S' when the member V' is turned, the portion U' is provided with projections $C^2$ that engage elongated slots $D^2$ in the hollow projection W'. The platform frame R' has a plurality of upwardly-extending lugs c, which support the usual glass platform a. By removing the platform, access is had to the upper end Z' of the members V', and also access may be had to the platform levers within the frame A.

By the arrangement of parts just described, any of the platform supports may be readily adjusted independently of the others and, therefore, the platform leveled without disengaging the platform supports from the scale levers. If desired, a set-screw $E^2$ may be employed for locking the member V' to the hanger when the parts have been adjusted.

It is very desirable to use a large platform, so as to form a stable support for baskets or other comparatively large articles, and as the size of the platform depends upon the spacing of the platform supports, the construction must be such as to give the desired distance between the supports for the platform. However, in order that the forward end $G^3$ of the lever F may be sensitive to even the slightest movement of the platform, the requisite distance between the bearings T' of the platform supports and the co-operating bearings $H^3$ of the hangers for the platform levers, must be maintained. If the distance between these two bearings is shortened, the sensitiveness of the scale will be materially lessened.

With my improved arrangement I provide for a comparatively large platform and at the same time, restrict the size of the base A. As shown, the rear end of the base A has outwardly-extending housings $F^2$ within which the rear hangers $G^2$ for the platform levers are arranged, while the forward hangers $H^2$ of the platform levers are positioned within the extension B. This arrangement allows the platform-supporting brackets to be positioned very close to the inner edge of the base frame A, thereby providing the maximum distance between the hangers and yet give the desired distance between each hanger $G^2$ and its co-operating platform support S'. The arrangement just described permits the size of the platform to be materially increased in comparison to the size of the base, over the structures now in common use.

The scale is supported by feet $J^2$ engaging the lower edge I' of the base, and these feet are adjustable to allow the scale to be properly leveled upon the counter or other support. The feet at the rearward edge of the base are attached to the lower edge of the housing or enlargement, which positions the feet without or beyond the rearward edge of the platform, thereby eliminating any tendency for the scale frame to tip if a heavy article is placed upon the platform in immediate proximity to the rear edge.

Figure 2:
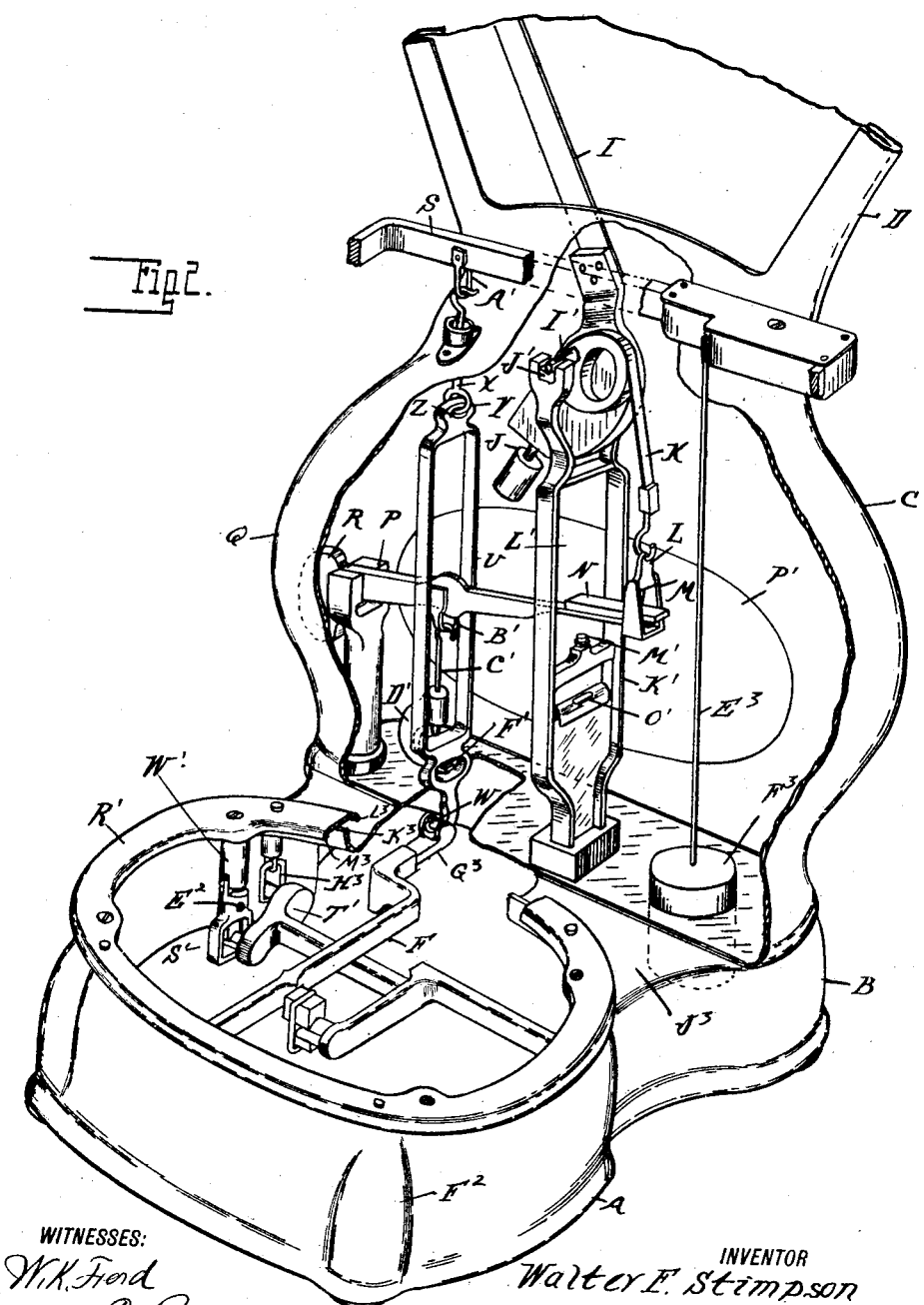
Figure 2 is a sectional perspective view with certain parts removed.

As will be noted upon reference to Figures 2 and 6 the upper edge $K^3$ of the portion A projects some little distance above the top $J^3$ of the extension B. This allows the upper edge $K^3$ to be continuous, forming in effect a collar surrounding the base A. The platform frame has the inner and outer edges provided with flanges $L^3$ and $M^3$ arranged upon opposite sides of the edge $K^3$ and extending downwardly preferably a slight distance therebelow.

The tare beam lever S carries forwardly thereof a tare beam and also a computing and weighing member parallel to the tare beam lever, and the latter is provided with rearwardly-extending arms $B^3$ that are arranged in guides $C^3$ on the upwardly-extending frame. $D^3$ is a receptacle at one end of the tare beam for receiving a quantity of suitable sealing material. Connected to the tare beam by means of a rod $E^3$ is a dash pot $F^3$.

While I have shown and described one embodiment of the invention, I do not desire to limit the protection to the particular structure illustrated, but consider the invention to be of sufficient scope to include various modifications.

What I claim as my invention is:

1. In a scale the combination with the platform levers, the tare beam and the pendulum weight, of a steelyard rod connecting the tare beam and the platform levers, an intermediate lever, a connection between the intermediate lever and the pendulum weight, and an adjustable connection between the intermediate lever and the steelyard rod.

2. In a scale the combination with the platform levers, the tare beam and the pendulum weight, of a steelyard rod connecting the tare beam and the platform levers, an intermediate lever, a bearing on said lever, a member engaging said bearing, a second member pivotally connected to the steelyard rod, and an adjustable connection between said members.

3. In a scale the combination with the platform levers, the tare beam and the pendulum weight, of a steelyard rod comprising a loop-shaped member connected at one end to the platform levers and operatively connected at its upper end to the tare beam, an intermediate lever, a connection between the intermediate lever and the pendulum weight, said intermediate lever extending through said loop-shaped steelyard rod, and a connection between the intermediate lever and the steelyard rod, comprising a bearing on the intermediate lever, a rod pivotally connected to said bearing, a member adjustably attached to said rod and pivotally engaging said steelyard rod.

4. In a scale the combination with the platform levers, the tare beam and the pendulum weight, of a steelyard rod comprising a loop-shaped member, a rod pivotally connected to the upper end of said loop-shaped member, a bearing on the tare beam having a pivotal engagement with said rod, and a connection between the lower end of said steelyard rod and the platform levers, an intermediate lever, a connection between the intermediate lever and the pendulum weight, and a connection between the intermediate lever and the loop-shaped member, comprising a rod pivotally connected to the intermediate lever, a hook-shaped member adjustably attached to the lower end of said rod, a needle-point bearing, and a connection between said hook-shaped member and said loop-shaped member.

5. In a scale the combination of a base, a frame extending upwardly above the base, platform levers within the base, a tare beam, a connection between the platform levers and the tare beam, a pendulum weight, operative connections between the pendulum weight and the platform levers, a support for the pendulum weight arranged upon said base and enclosed within said upward extension, and a level carried by said support.

6. In a scale, the combination with a base, of platform levers arranged therewithin, a platform frame, supports for said platform frame including bearings engaging the platform levers, and screws adjustably engaging said bearings, said screws having shoulders engaging the platform frame and being accessible for adjustment from above the platform frame.

7. In a scale the combination of platform levers, a platform frame, supports for said platform frame including bearings engaging the platform levers, interengaging parts upon the platform and the supports, and means accessible from above the platform frame for effecting a relative adjustment between the platform frame and the bearings.

8. In a scale the combination of a platform frame, platform levers, platform supports, comprising bearings engaging the platform levers, telescoping parts upon the bearing and the platform frame, and means for effecting a vertical adjustment of said telescoping parts.

9. The combination of platform levers, a platform frame, supports for carrying the platform frame by the platform levers, and means for effecting a vertical adjustment of the platform frame relative to said supports accessible from above the platform frame.

10. In a scale the combination of a base, platform levers arranged therein, a platform frame, supports for carrying the platform frame by the platform levers, said supports including a depending hollow projection upon the platform frame and bearing, and a screw engaging said hollow projection and adjustably connected to said bearing, there being an aperture in the platform frame permitting access to the screw.

11. In a scale, a base frame, outwardly-extending housings at the rear corners of said base frame, a platform, platform levers in said base frame, an extension projecting forwardly of said base frame, rear hangers for the platform levers arranged in said housings, and forward hangers for the platform levers positioned within said extension.

12. In a scale, a base frame, outwardly-extending housings at corners of said base frame, a platform, platform levers in the base frame, hangers for the platform levers arranged in said housings and feet supporting the base frame engaging the lower edge of said housings.

13. In a scale, a base frame, a platform frame arranged over the upper edge of the base frame and projecting therebeyond, and supporting feet for the base frame positioned without the outer edge of the platform frame.

14. In a scale, the combination with platform levers, of a platform frame, supports for said platform frame including bearings engaging the platform levers, and screws engaging said bearings and supporting the platform frame, the latter being apertured to give access to said screws.

15. In a scale, the combination with platform levers, of a platform frame, supports for said platform frame including bearings engaging the platform levers, and members engaging said bearings with the platform frame rotatively adjustable to vary the vertical spacing of the platform frame from said bearings, the platform frame being apertured to give access to said members.

In testimony whereof I affix my signature in presence of two witnesses.

WALTER F. STIMPSON.

Witnesses:
WM. J. BELKNAP,
JAMES P. BARRY.